United States Patent
Barstow (10) Patent No.: US 12,448,193 B2
(45) Date of Patent: Oct. 21, 2025

(54) COMPRESSIBLE GASKET (71) Applicant: THE COCA-COLA COMPANY, Atlanta, GA (US)

(72) Inventor: Justin Barstow, Atlanta, GA (US)

(73) Assignee: The Coca-Cola Company, Atlanta, GA (US)

(*) Notice: Subject to any disclaimer, the term of this patent is extended or adjusted under 35 U.S.C. 154(b) by 350 days.

(21) Appl. No.: 17/874,657

(22) Filed: Jul. 27, 2022

(65) Prior Publication Data
US 2024/0034535 A1 Feb. 1, 2024

(51) Int. Cl.
B65D 75/58 (2006.01)
B65D 53/02 (2006.01)
B65D 77/06 (2006.01)
F16J 15/02 (2006.01)

(52) U.S. Cl.
CPC ......... B65D 75/5877 (2013.01); B65D 53/02 (2013.01); B65D 77/068 (2013.01); F16J 15/022 (2013.01)

(58) Field of Classification Search
CPC .. B65D 75/5877; B65D 53/02; B65D 77/068; F16J 15/022
See application file for complete search history.

(56) References Cited

U.S. PATENT DOCUMENTS

| | | | | |
|---|---|---|---|---|
| 1,528,283 A | * | 3/1925 | Whitesides | B67B 7/26 222/90 |
| 2,001,481 A | * | 5/1935 | Abbott | B67B 7/26 411/63 |
| 2,007,449 A | * | 7/1935 | Kernodle | B67B 7/26 222/542 |
| 2,023,397 A | * | 12/1935 | Blomgren | B67B 7/26 222/542 |
| 3,549,049 A | * | 12/1970 | Alwin | B67B 7/26 222/91 |
| 3,599,836 A | * | 8/1971 | Hegi | B67B 7/26 222/90 |
| 3,684,132 A | * | 8/1972 | Coppens | F17C 13/04 222/5 |
| 3,926,339 A | * | 12/1975 | Openchowski | B67B 7/28 222/530 |
| 3,973,698 A | * | 8/1976 | Kato | B67B 7/26 222/91 |
| 4,206,927 A | * | 6/1980 | Garascia | F16J 15/104 277/654 |
| 4,619,377 A | * | 10/1986 | Roos | F16K 3/246 222/129 |
| 4,796,899 A | * | 1/1989 | Herrick | F16L 41/082 285/192 |
| 4,801,007 A | * | 1/1989 | Rule | A61J 11/04 206/217 |
| 4,881,662 A | * | 11/1989 | Tallman | B67B 7/26 222/569 |

(Continued)

Primary Examiner — Frederick C Nicolas
(74) Attorney, Agent, or Firm — Jim Patterson (57) ABSTRACT A compressible gasket is provided that includes a compressible core having opposing first and second sides. The opposing first and second sides are covered, at least partially, with adhesive material. The compressible gasket can prevent leakage of contents from a pouch by being disposed between, and adhered to, a mating flange on a male piercer and a mating surface on a pouch.

12 Claims, 5 Drawing Sheets (56) References Cited

U.S. PATENT DOCUMENTS

| | | | | |
|---|---|---|---|---|
| 5,150,910 | A * | 9/1992 | Udagawa | F16J 15/123 |
| | | | | 277/592 |
| 5,879,789 | A * | 3/1999 | Dolan | B32B 27/322 |
| | | | | 428/323 |
| 6,598,757 | B2 * | 7/2003 | Stillinger | B65D 5/746 |
| | | | | 220/714 |
| 6,736,406 | B1 * | 5/2004 | Provencher | F16J 15/061 |
| | | | | 277/650 |
| 6,932,239 | B2 * | 8/2005 | McKitrick | A62B 18/086 |
| | | | | 215/388 |
| 7,073,686 | B2 * | 7/2006 | Hanell | B67B 7/26 |
| | | | | 220/267 |
| 7,111,848 | B2 * | 9/2006 | Tachikawa | B29C 43/021 |
| | | | | 604/230 |
| 8,100,879 | B2 * | 1/2012 | Blank | B65D 5/746 |
| | | | | 222/81 |
| 8,353,428 | B2 * | 1/2013 | Pritchard | G01F 11/08 |
| | | | | 222/105 |
| 8,448,820 | B2 * | 5/2013 | Johnson | B65D 77/067 |
| | | | | 222/542 |
| 8,884,168 | B2 * | 11/2014 | Cook | H05K 9/0015 |
| | | | | 174/356 |
| 2014/0353928 | A1 * | 12/2014 | Nethery | E06B 7/23 |
| | | | | 277/630 |
| 2019/0376601 | A1 * | 12/2019 | Lehr | F16J 15/122 |

* cited by examiner

COMPRESSIBLE GASKET

BACKGROUND

Beverage storage and delivery systems, including bag-in-box (BIB) packages of various configurations, are widely used in the beverage industry. Unfortunately, leaks can often develop at an interface between a male piercer and a bag in such systems due to gaps between the male piercer and the bag. Such leaks can be especially prevalent when lower viscosity products are stored in the bag. Additionally, sometimes the male piercer can fully disengage from the bag, exacerbating leakage.

SUMMARY

In an example embodiment, a male piercer for use with a product storage pouch includes a cap having one or more valves. The male piercer also includes a piercer end with a mating flange having an interface surface. The male piercer further includes a compressible gasket with a compressible core having a first side attached to the interface surface and an opposing second side covered at least in part with an adhesive. A tube enables fluid flow between the piercer end and the cap.

In another example embodiment, a system includes a pouch holding a liquid product. The system also includes a compressible gasket with a compressible core having opposing first and second sides, with both the first side and the second side being covered at least in part with an adhesive. The system further includes a male piercer attached to the pouch, with the compressible gasket being disposed between a mating flange of the male piercer and a mating surface associated with the pouch.

In yet another example embodiment, a compressible gasket is provided. The compressible gasket includes a compressible core having opposing first and second sides with adhesive material covering at least a portion of the first and second sides.

This summary is not intended to identify key or essential features of the claimed subject matter, nor is it intended to be used as an aid in limiting the scope of the claimed subject matter. Other principal features of the current disclosure will become apparent to those skilled in the art upon review of the following drawings, the detailed description, and the appended claims.

BRIEF DESCRIPTION OF THE DRAWINGS

Illustrative embodiments will be described referring to the accompanying drawings, wherein like numerals denote like elements.

DETAILED DESCRIPTION

In the following description, numerous details are set forth to provide an understanding of some embodiments of the present disclosure. However, it will be understood by those of ordinary skill in the art that the system, its components, and its associated methodology may be practiced without these details and that numerous variations or modifications from the described embodiments may be possible.

As described herein, various techniques and technologies can be associated with the use of a compressible gasket at an interface between a male piercer and a pouch configured to hold a liquid. Deployment of such a gasket can decrease or eliminate leakage from the pouch at the interface and allow for a wide range of motion of the male piercer relative to the pouch while sustaining the integrity of the interface.

Figure 1:
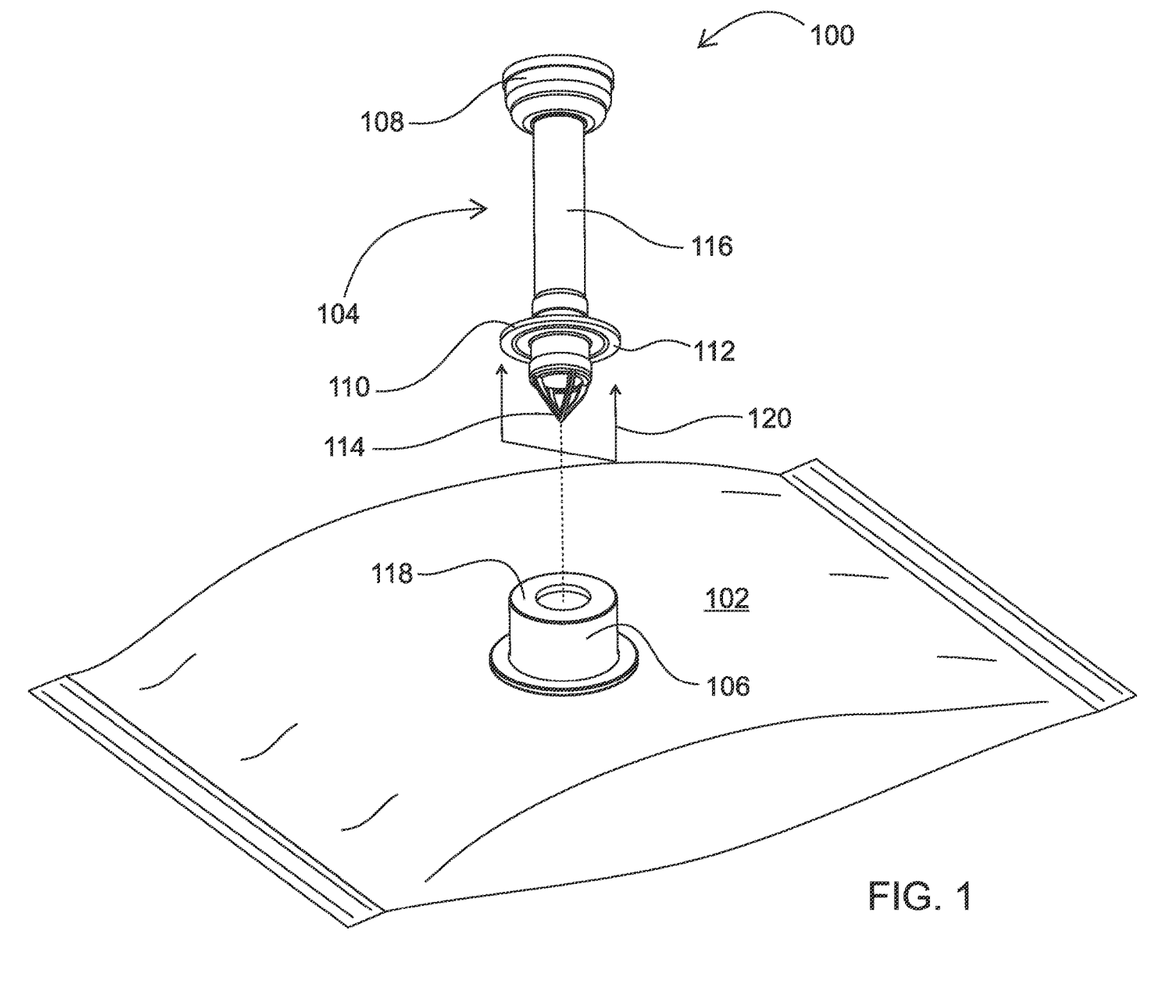
FIG. 1 depicts a system including, a pouch, a male piercer, and a female fitment in accordance with an illustrative implementation.

FIG. 1 illustrates a system 100 including, a product storage pouch 102, a male piercer 104, and a female fitment 106 in accordance with one possible implementation. Pouch 102 can include any pouch, bag, or envelope configured to hold liquid known in the art. In one possible implementation, pouch 102 can hold any beverage (including concentrates) known in the art including, for example, fruit juice (including orange juice, lemon juice, apple juice, mango juice, etc.), soft drinks, coffee, tea, and dairy-based beverages. In one possible implementation, system 100 can be used in a bag-in-box assembly.

Male piercer 104 can include a cap 108 including one or more valves, a piercer end 110 with a mating flange 112 and a piercing architecture 114, and a tube 116. Piercer 104 can include any male piercer known in the art. In one possible implementation, male piercer 104 is made at least partially of plastic. Cap 108, piercer end 110 and tube 116 may be made from any materials known in the art, and in some instances, one or more of cap 108, piercer end 110, and tube 116 can each be made from different materials.

Female fitment 106 can include any female fitment known in the art, and can be made from any material known in the art including, for example, plastic. Moreover, in one possible implementation, a film associated with pouch 102 can cover female fitment 106, and a mating surface 118 of female fitment 106. This can occur, for example, by heat fixing the film on mating surface 118. Mating surface 118 is configured to interface with mating flange 112 of male piercer 104.

In some possible embodiments, a film associated with pouch 102 may be disposed under mating surface 118, inside of female fitment 106. In yet other embodiments, a film associated with pouch 102 may be disposed under female fitment 106 or be absent entirely.

Figure 2:
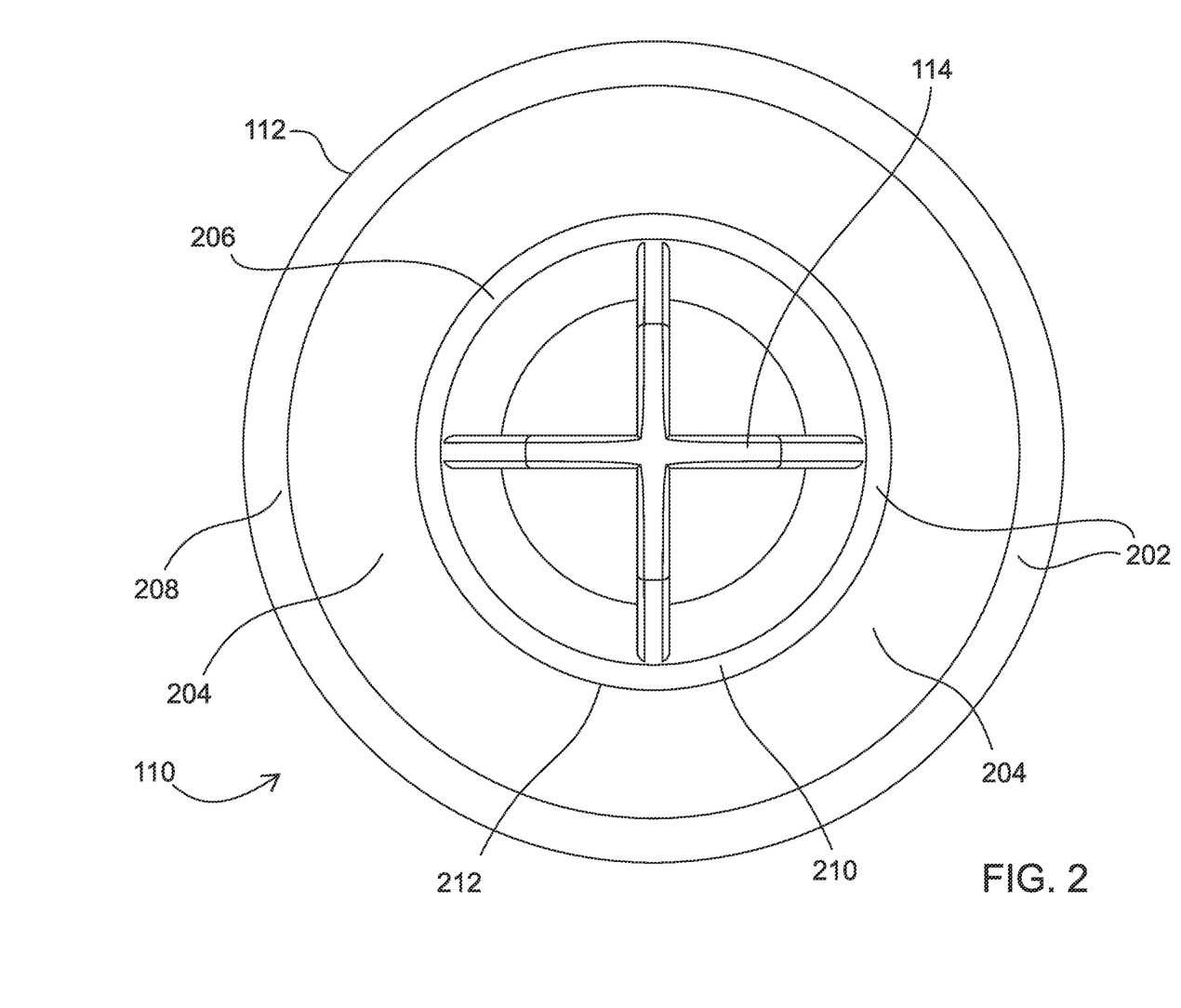
FIG. 2 depicts a piercer end including a compressible gasket in accordance with another illustrative implementation.

FIG. 2 illustrates piercer end 110 with architecture 114 as viewed from direction 120 in FIG. 1 in accordance with one possible implementation. As depicted, an interface surface 202 of mating flange 112 configured to interface (either directly or indirectly) with mating surface 118 of female fitment 106, includes a compressible gasket 204 attached thereto. FIG. 2 illustrates gasket 204 as covering only a portion of interface surface 202, with an inner area 206 and an outer area 208 of interface surface 202 left uncovered. It will be understood however, that gasket 204 can provide any amount of coverage of interface surface 202 desired, including, for instance, full coverage of interface surface 202. Moreover, though depicted as circular in shape, gasket 204 can take any desired shape known in the art, including for instance, an oval, a square, a triangle, a hexagon, a pentagon, etc. Further, in order to ensure unimpeded fluid flow from pouch 102, gasket 204 can have an inner void area 210 defined by a cutaway line 212. Inner void area 210 can take any shape known in the art, and can be configured to avoid contact or interfere with architecture 114 of piercer end 110.

Figure 3:
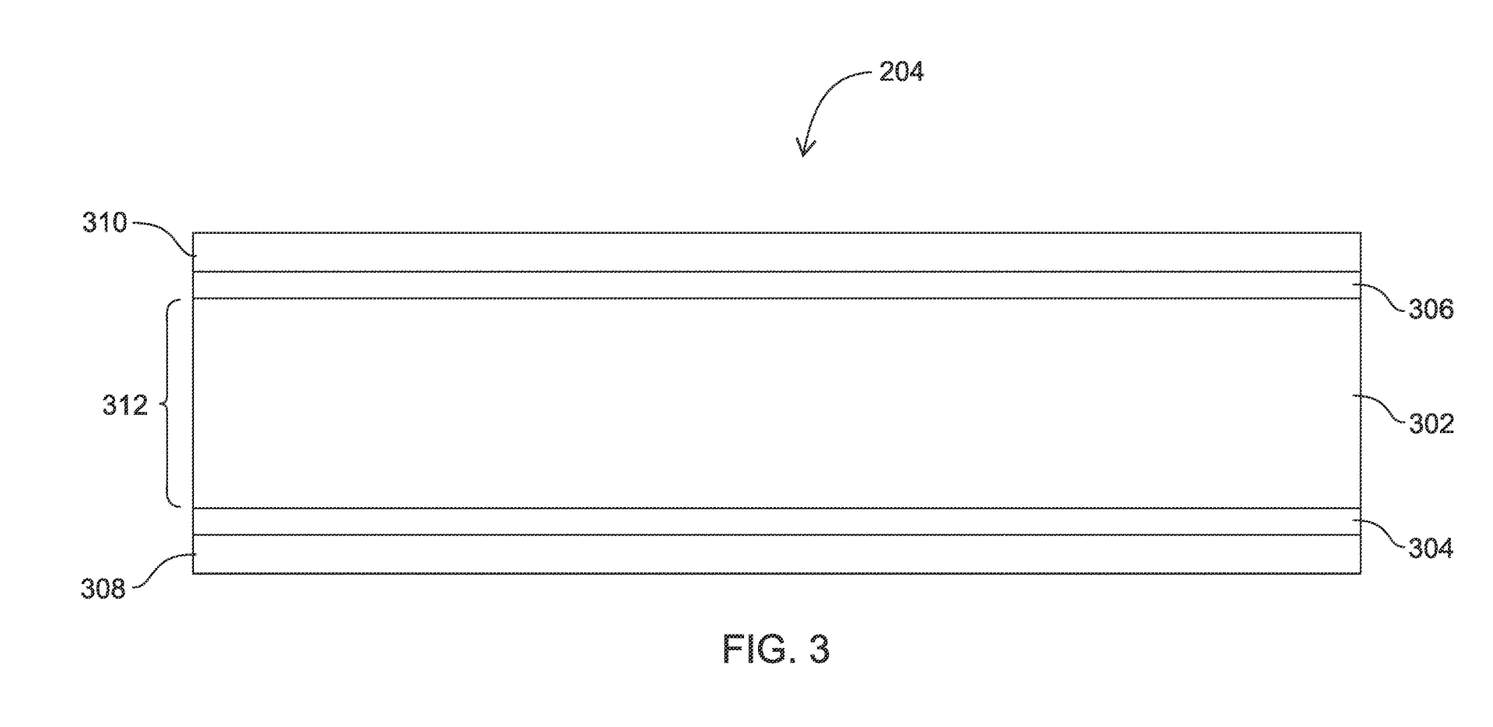
FIG. 3 depicts a compressible gasket in accordance with another illustrative implementation.

FIG. 3 depicts a cutaway view of gasket 204 in accordance with one possible implementation. As illustrated, gasket 204 includes a core 302 made at least in part from compressible material, with adhesive 304, 306 at its ends. Gasket 204 can also include removable liners 308, 310 covering adhesive 304, 306.

Core 302 can include any compressible material known in the art, including, for example, closed cell foam, a layer of extrudate, a gel application, etc. Moreover, core 302 can have any thickness 312 desired or known in the art. In one possible implementation, core 302 can be thick enough and compressible enough to overcome misalignment issues arising during mating of piercing end 114 with fitment 106. For example, in one possible implementation, thickness 312 when core 302 is in a non-load bearing state can be approximately 0.076 inches plus or minus 0.05 inches.

Adhesives 304, 306 can include any adhesives known in the art including, for instance, standalone adhesives, two sided tapes, etc. In one possible embodiment one or both of adhesives 304, 306 can be insoluble in water and can include acrylic-based adhesives, solvent-based adhesives, etc. In one possible implementation, adhesives 304, 306 can be pressure sensitive. In another possible implementation, adhesives 304, 306 can be heat sealed. In yet another possible implementation, adhesives 304, 306 can be any possible combination of pressure sensitive and heat sealed materials. Adhesives 304, 306 can also have any desired thickness. In one possible implementation, this can include, for example, a thickness ranging between 0.05 mm-0.13 mm.

Liners 308, 310 can include any liners made of any material known in the art, including paper, various plastics (including polyesters), various composites, etc.

In one possible implementation, adhesive 304 configured to adhere to mating surface 118 of female fitment 106 (or a film coving it), and adhesive 306 configured to adhere to interface surface 202 of mating flange 112, can be made of the same material and be configured to prevent piercer 104 from disengaging from female fitment 106. In yet another possible implementation, different types of adhesives 304, 306 may be used at the same time on gasket 204 to prevent piercer 104 from disengaging from female fitment 106. For example, one type of adhesive 304 may be desired to more favorably adhere to mating surface 118 of female fitment 106 (or a film coving it), while a different adhesive 306 may be desired to more favorably adhere to interface surface 202 of mating flange 112. Any conceivable combination of adhesives 304, 306 may thus be present on gasket 204. In such implementations, differing liners 308, 310 may also be employed concurrently on gasket 204, with each liner 308, 310 being chosen to favorable interface with the adhesive 304, 306 with which they are in contact.

In operation, interface gasket 204 can be placed between mating flange 112 and mating surface 118, and core 302 can compress in reaction to forces encountered from mating flange 112 and/or mating surface 118 resulting in a decrease of thickness 312. This decrease need not be uniform across gasket 204 as thickness 312 can decrease in varying degrees at different locations on gasket 204 in accordance with forces or stresses placed on core 302 by mating flange 112 and/or mating surface 118 at these different areas.

For example, in some instances a fit and seal between mating flange 112 and mating surface 118 may be adversely affected by a variety of factors including, for instance, ovality, geometric variation due to mold inconsistency suffered during the creation of male piercer 104 and/or female fitment 106, etc. Further, in some instances, when male piercer 104 is deployed to mate with pouch 102, mating flange 112 and/or mating surface 118 can be damaged, thus compromising a possible seal between mating flange 112 and/or mating surface 118. Interface gasket 204 can decrease and ameliorate the deleterious effects of such issues through compression of core 302 to accept areas of mating flange 112 and/or mating surface 118 which include abnormalities, protrusions, etc. Similarly, core 302 can expand into areas of mating flange 112 and/or mating surface 118 where deflections, scratches, gouges, etc., may exist.

Further, as stresses change at the interface between mating flange 112 and mating surface 118 (such as when an orientation of male piercer 104 changes with respect to female fitment 106 during shipping, deployment, etc.) thickness 312 across gasket 204 can dynamically change to accommodate relative movement between mating flange 112 and mating surface 118 while maintaining a seal between mating flange 112 and mating surface 118 and preventing undesired leaks of product from pouch 102.

Figure 4:
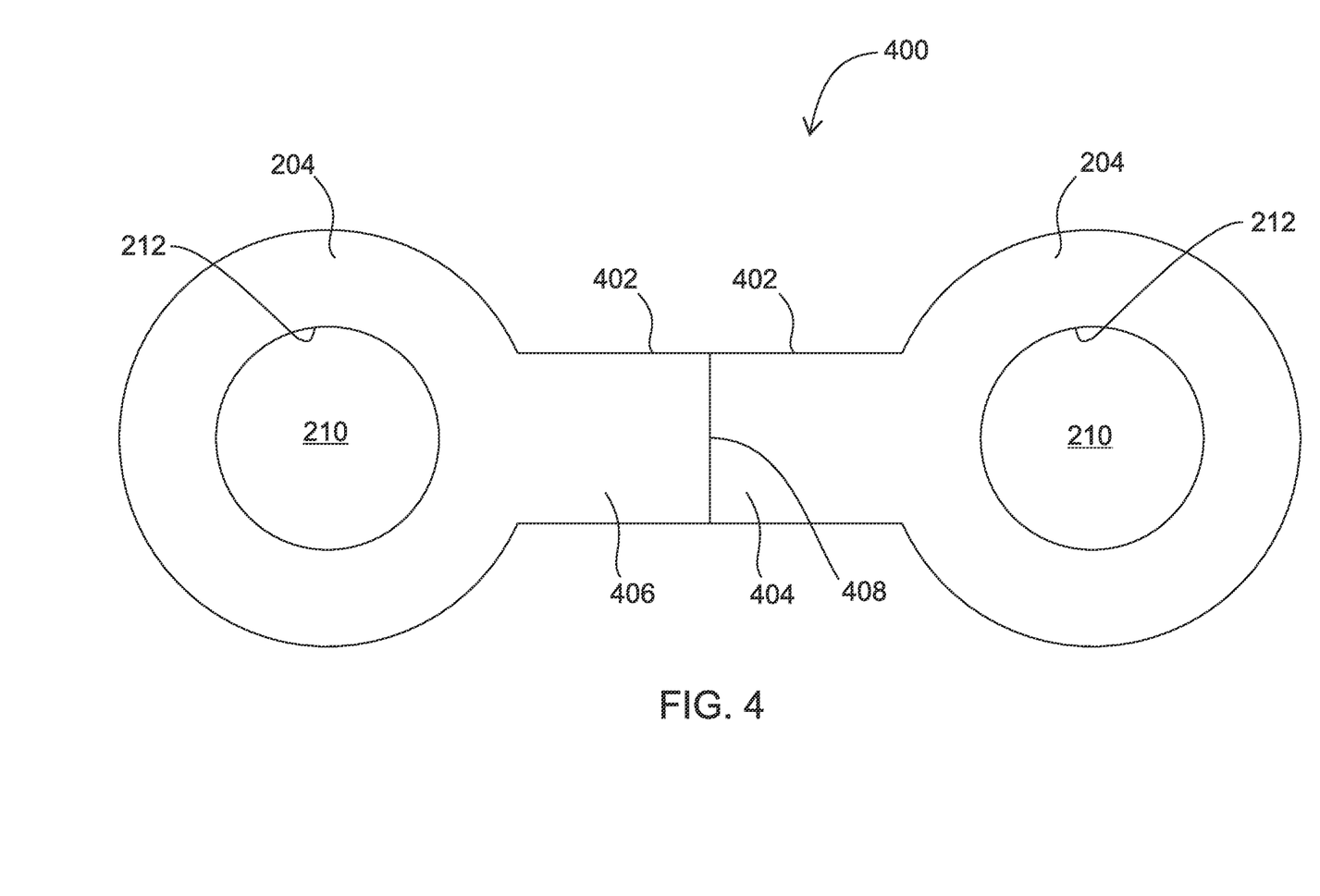
FIG. 4 depicts several compressible gaskets in accordance with another illustrative implementation.

FIG. 4 depicts a top view of a collection 400 of several gaskets 204 in accordance with one possible implementation. In some instances, production, storage, shipping and/or use of gasket 204 may be made easier and/or cheaper by combining two or more gaskets 204. In FIG. 4, two gaskets 204 are combined to form collection 400, though it will be understood that any number of gaskets may be combined in any possible configuration to form collection 400.

As shown, gaskets 204 are connected by a member 402 comprising separate tabs 404, 406. A removal joint 408 can separate tabs 404, 406. Joint 408 can be a printed line, a fold, a score, and/or perforations through a portion of a thickness of member 402.

Void 210 in gasket 204 may be created in any manner known in the art, including during production of gasket 204, by punching and/or cutting material from gasket 204, etc. Moreover, void 210 may have any desired size. In one possible example, void 210 can have a diameter from between approximately 0.5 inches to 1.0 inch. Similarly, an outer diameter of gasket 204 can be of any desired size including, for example, a diameter from between 1.0 inch to 1.4 inches.

When a single gasket 204 is desired for use, it may be accessed by separating the gasket 204 from collection 400 at joint 408. If present, liner 308, 310 can be removed exposing adhesive 304, 306 and gasket 204 can be adhered where desired (such as, for instance on the interface surface 202 of mating flange 112 on male piercer 104). If desired, liner 308, 310 (if present) on an opposing side of gasket 204 can be left in place and removed later, when male piercer 104 is to be engaged with female fitment 106 on pouch 102.

Figure 5:
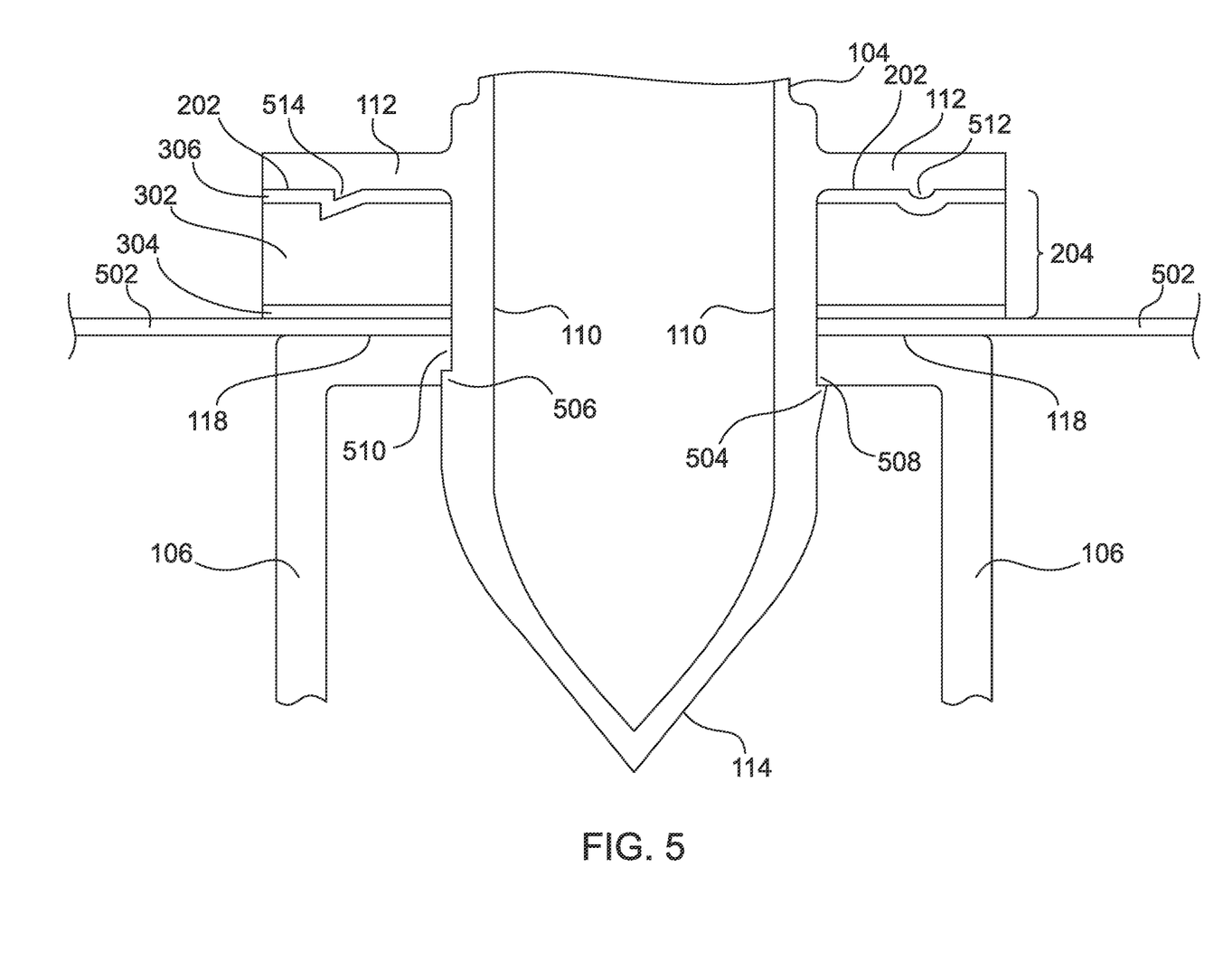
FIG. 5 depicts a male piercer attached to a female fitment in accordance with yet an illustrative implementation.

FIG. 5 depicts male piercer 104 attached to female fitment 106 in accordance with an illustrative embodiment. In operation, to prepare male piercer 104 for mating with fitment 106, liners 308, 310 can be removed from adhesive 304, 306 in any manner known in the art, including manually, robotically, etc. In one possible implementation, one liner 308, 310 can be removed in order to adhere gasket 204 to male piercer 104 with liner 308, 310 on an opposite side of gasket 204 being left on gasket 204 until mating of piercing end 114 with pouch 102 and mating surface 118 of female fitment 106 (or a film covering it) is desired. Alternately, one liner 308, 310 can be removed in order to adhere gasket 204 to mating surface 118 of female fitment 106 (or a film covering mating surface 118), and liner 308, 310 on an opposite side of gasket 204 can be left on gasket 204 until mating of piercing end 114 with gasket 204 on mating surface 118 (or a film covering it) is desired.

As illustrated, when male piercer 104 is mated with pouch 102 via female fitment 106, piercing end 110 and architecture 114 can be at least partially disposed inside of female fitment 106. In implementations in which a film 502 associated with pouch 102 covers female fitment 106, film 502 can be pierced by architecture 114 allowing fluid contact between male piercer 104 and a fluid inside of pouch 102. In implementations in which film 502 associated with pouch 102 is inside female fitment 106, film 502 can be similarly pierced by architecture 114, allowing fluid contact between male piercer 104 and a fluid inside pouch 102.

In some possible implementations, male piercer 104 can include securing features 504, 506 on or near piercing end 110 configured to contact at least partially with complementary securing features 508, 510 on female fitment 106 and impede the removal of piercing end 110 from female fitment 106. Any securing features 504, 506 and complementary securing features 508, 510 known in the art can be employed, including any possible combinations thereof. This can include scenarios in which no securing features 504, 506 or complementary securing features 508, 510 are present, only one securing feature 504, 506 and one complementary securing feature 508, 510 is present, etc.

In one possible embodiment, mating features 512, 514 can be disposed on interface surface 202 of mating flange 112. Mating features 512, 514, can take any shape or configuration known in the art, including any possible combination thereof, such as, for instance, a bump (such as mating features 512), a tooth (such as mating features 514), etc. Further, mating features 512, 514 can comprise distinct protrusions at discrete locations on interface surface 202, or form ridges with various cross-sections running all or a portion of a length of interface surface 202. In yet another possible scenario, no mating features 512, 514 may be present on interface surface 202.

In operation, when mating features 512, 514, irregularities, displaced areas, and/or damaged areas of mating flange 112 and/or mating surface 118 are encountered, areas of core 302 can compress and/or expand to accommodate them, thus maintaining a seal between mating flange 112 and mating surface 118, preventing any undesired leaks of product from pouch 102. This includes, for example, instances in which mating flange 112 is cocked to one side of mating surface 118. In such instances areas of core 302 can displace in order to prevent the formation of void spaces between mating flange 112 and mating surface 118, thus maintaining a seal between mating flange 112 and mating surface 118.

As noted above, in certain implementations, film 502 may at least partially cover mating surface 118. Often, this can include film 502 having been heat fixed to some or all of mating surface 118. Therefore, it will be understood that any discussions herein regarding the creation and maintenance of a seal by gasket 204 between mating flange 112 and mating surface 118 can include scenarios in which film 502 may be disposed between gasket 204 and mating surface 118. This includes instances in which some or all of mating surface 118 is covered by film 502. Consequently, in some scenarios gasket 204 may contact areas of mating surface 118 fully covered by film 502. In other possible scenarios, gasket 204 may simultaneously cover areas of mating surface 118 uncovered by film 502 and one or more areas of mating surface 118 covered by film 502. Therefore, the term mating surface 118 as used herein will be understood to include mating surface 118 on its own, and mating surface 118 either partially or fully covered by film 502.

Moreover, it will be understood that implementations can exist in which mating flange 112 can interface with pouch 102 through film 502 in the absence of a formal female fitment 106. Thus, the term mating surface 118, as used herein, will be further understood to include film 502 without a female fitment underneath.

It will also be understood that if pouch 102 is hermetically sealed before being pierced by male piercer 104, a hermetic seal can be maintained by a seal created between mating flange 112 and mating surface 118 by gasket 204 along with the employment of one or more valves located within male piecer 104, such as in cap 108.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise. The illustrative embodiments may be implemented as a method, apparatus, or article of manufacture using standard engineering techniques.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A system comprising:
   a pouch holding a liquid product;
   a compressible gasket including a compressible core having opposing first and second sides, wherein both the first side and the second side are covered at least in part with an adhesive; and
   a male piercer attached to the pouch, wherein the compressible gasket is disposed between a mating flange of the male piercer and a mating surface associated with the pouch.

2. The system of claim 1, wherein the compressible core of the compressible gasket is made from closed cell foam.

3. The system of claim 1, wherein the compressible gasket has an inner diameter less than or equal to 19.90 mm.

4. The system of claim 1, wherein a shape of the compressible gasket is configured to match a shape of the mating surface associated with the pouch.

5. The system of claim 1, wherein the adhesive is water insoluble.

6. The system of claim 1, wherein the compressible gasket core has a thickness between 0.071 in-0.081 in.

7. The system of claim 1, wherein the mating surface associated with the pouch comprises a mating surface on a female fitment at least partially covered by a film associated with the pouch.

8. A system comprising:
   a pouch configured to be employed in a bag-in-box package used in a beverage dispenser, the pouch being configured to hold a liquid product, the pouch further including a mating surface; and
   a compressible gasket including:

a compressible core having opposing first and second sides; and adhesive material covering at least a portion of the first and second sides, wherein the second side of the compressible gasket is secured to the mating surface by the adhesive material and the first side is configured to mate with a mating flange on a male piercer.

9. The system of claim 8, wherein the compressible core is made from closed cell foam.

10. The system of claim 8, wherein the adhesive is water insoluble.

11. The system of claim 8, wherein the compressible core has a thickness between 0.071 in-0.081 in.

12. The system of claim 8, further comprising a removable liner covering the adhesive material on the first side.

* * * * *